(12) United States Patent
Bokvist et al.

(10) Patent No.: US 11,307,373 B2
(45) Date of Patent: Apr. 19, 2022

(54) LENS MEMBER FOR A LENS ARRANGEMENT OF A CAMERA DEVICE

(71) Applicant: Axis AB, Lund (SE)

(72) Inventors: Malte Bokvist, Lund (SE); Jöns Danelius, Lund (SE)

(73) Assignee: AXIS AB, Lund (SE)

( * ) Notice: Subject to any disclaimer, the term of this patent is extended or adjusted under 35 U.S.C. 154(b) by 32 days.

(21) Appl. No.: 16/937,605

(22) Filed: Jul. 24, 2020

(65) Prior Publication Data
US 2021/0080676 A1 Mar. 18, 2021

(30) Foreign Application Priority Data
Sep. 17, 2019 (EP) .................................. 19197642

(51) Int. Cl.
*G02B 7/02* (2021.01)
(52) U.S. Cl.
CPC ..................... *G02B 7/02* (2013.01)
(58) Field of Classification Search
CPC ........ G03B 17/12; G03B 11/043; G02B 7/02; G02B 7/00; G02B 7/021; G02B 7/022; H04N 5/2254; H04N 5/2252; H04N 5/2251; H04N 5/2256
USPC .......................................... 345/335; 359/819
See application file for complete search history.

(56) References Cited

U.S. PATENT DOCUMENTS

| | | | | |
|---|---|---|---|---|
| 5,701,015 A | * | 12/1997 | Lungershausen | G03B 15/05 250/494.1 |
| 6,476,851 B1 | | 11/2002 | Nakamura | |
| 7,116,371 B2 | * | 10/2006 | Kakiuchi | G01S 17/894 348/348 |
| 7,324,154 B2 | * | 1/2008 | Cheng | H04N 5/2252 348/373 |
| 7,330,649 B2 | * | 2/2008 | Finizio | G08B 13/1965 396/146 |
| 8,576,333 B2 | * | 11/2013 | Hsu | G03B 11/045 348/374 |
| 10,578,855 B2 | * | 3/2020 | Hatase | G02B 23/243 |
| 10,816,760 B2 | * | 10/2020 | Cho | G02B 1/041 |
| 10,996,456 B2 | * | 5/2021 | Hatase | A61B 1/04 |
| 11,076,076 B2 | * | 7/2021 | Matikainen | G03B 17/12 |

(Continued)

FOREIGN PATENT DOCUMENTS

| | | |
|---|---|---|
| JP | 09-033784 A | 2/1997 |
| WO | 2017/132057 A1 | 8/2017 |

*Primary Examiner* — William R Alexander
(74) *Attorney, Agent, or Firm* — Xsensus LLP

(57) ABSTRACT

A lens arrangement (200) for a camera device, the lens arrangement (200) comprising: a lens member (100) comprising a barrel (104) enclosing a lens unit (106) and extending along a longitudinal lens member axis (A), a lens holder (202) comprising a wall surrounding a cavity, wherein the lens member is at least partly inserted into the cavity, wherein the barrel (104) of the lens member (100) defines a channel (102) which extends inside a wall section of the barrel (104) of the lens member (100) in parallel with the longitudinal lens member axis (A) and which has a first end opening facing a field of view of the lens arrangement (200), and wherein the lens arrangement (200) comprises an emitter (110) arranged to emit electromagnetic radiation to an area located in the field of view of the lens arrangement (200) via the channel (102) and the first end opening.

13 Claims, 5 Drawing Sheets

(56) References Cited

U.S. PATENT DOCUMENTS

| | | | |
|---|---|---|---|
| 2002/0005997 A1* | 1/2002 | Oba | H04N 5/2254 359/819 |
| 2005/0041143 A1* | 2/2005 | Kakiuchi | G01S 17/86 348/370 |
| 2006/0109374 A1* | 5/2006 | Cheng | H04N 5/2256 348/373 |
| 2006/0222357 A1 | 10/2006 | Tomimoto | |
| 2006/0268435 A1* | 11/2006 | Finizio | G08B 13/19626 359/819 |
| 2012/0092549 A1* | 4/2012 | Hsu | H04N 5/2256 348/374 |
| 2017/0307872 A1* | 10/2017 | Hatase | A61B 1/0661 |
| 2018/0241918 A1 | 8/2018 | Campbell et al. | |
| 2019/0361200 A1* | 11/2019 | Cho | H04N 5/2254 |
| 2020/0201024 A1* | 6/2020 | Hatase | A61B 1/05 |
| 2020/0412919 A1* | 12/2020 | Matikainen | G03B 15/03 |

* cited by examiner

LENS MEMBER FOR A LENS ARRANGEMENT OF A CAMERA DEVICE

CROSS-REFERENCE TO RELATED APPLICATION

The present application claims priority to EP 19197642.2, filed Sep. 17, 2019, the entire contents of which are incorporated herein by reference.

FIELD OF THE INVENTION

The invention relates to a lens arrangement for a camera device.

BACKGROUND ART

Modular cameras such as network cameras may be used in many different situations, both indoors and outdoors. The versatility of modular cameras has led to an increased demand for cost effective production of modular cameras. To meet this demand, it is desirable to reduce, not only the cost of the components of the modular cameras but also the costs associated with the assembly of modular cameras. It is further desirable to improve the functionalities of these modular cameras.

A modular camera normally comprises two separate parts; a sensor unit and a main unit connected to the senor unit via cable.

The sensor unit may comprise a lens holder and a lens member releasably supported by the lens holder. An image sensor may be arranged in the lens holder. The sensor unit may be quite small and have a length in the range of 1-10 mm and a diameter in the range of 1-10 mm.

The main unit may be arranged for image processing and network communication and may also be placed separately from the sensor unit.

The sensor unit of a modular camera thus comprises a several components, and the assembly of the sensor unit requires a plurality of steps which are complicated, time consuming and costly. Furthermore, the assembly requires high precision. Small deviations in the relative position of the components within the sensor unit of the modular camera may for example lead to misalignment reducing the performance of the modular camera. Specifically, proper alignment of the lens member in the lens holder is especially critical as a small deviation may significantly reduce the image quality achieved by the modular camera.

In typical monitoring cameras, active accessories such as sound recording or illumination are placed at a distance from the lens, increasing the total size of the camera.

Further, modular cameras may be used in different environments and for different purposes. To obtain high quality images or other added information from images, accessories may be added to the sensor unit of the modular camera, thereby increasing the size of the sensor unit.

US6476851B1 D1 discloses an electronic endoscope in which distortion is corrected and shading is prevented. The endoscope comprises an imaging unit arranged in an end of the endoscope. A pair of light guides 48 is arranged outside the imaging unit and extends in the direction of the optical axis of the imaging unit.

SUMMARY OF THE INVENTION

In view of that stated above, the object of the present invention is to provide a lens arrangement with improved functionality and compactness for a camera device.

To achieve at least one of the above objects and also other objects that will be evident from the following description, a lens arrangement and a camera device are provided according to the present invention. Preferred embodiments will be evident from the description.

According to an example, a lens member for a lens arrangement of a camera device may comprise a barrel enclosing a lens unit and extending along a longitudinal lens member axis. The barrel defines a channel extending in parallel to the longitudinal lens member axis and has a first end opening provided in a front end of the lens member. The channel is configured to guide sound and/or electromagnetic radiation from an emitter associated with the lens member to an area in front of the lens member via the first end opening and/or the channel is configured to guide sound and/or electromagnetic radiation from an area in front of the lens member to a receiver associated with the lens member via the first end opening.

The provided lens member may have an improved functionality in comparison to a conventional lens member. For example, the lens member may collect sound through said channels, without the need of any external device for receiving or transmitting sound. This may be beneficial for modular monitoring cameras where conventional modular monitoring cameras do not have sound capture as a built-in function. The present lens member may hold a variety of different functions. The provided lens member may be manufactured in a small size which is often desirous when producing modular cameras that are to be used as monitoring cameras. The provided lens member allows for manufacturing of a compact lens arrangement without loosing functionality.

The emitter and/or receiver may be arranged within the channel. By this, a cost efficient lens member and lens arrangement may be provided.

The lens member may comprise a light guide. The light guide may be arranged in the channel. This may allow for a channel not having a straight extension but still being configured for guiding electromagnetic radiation in the form of light.

According to a first aspect, there is provided a lens arrangement for a camera device, the lens arrangement comprising: a lens member comprising a barrel enclosing a lens unit and extending along a longitudinal lens member axis, and a lens holder comprising a wall surrounding a cavity. The lens member is at least partly inserted into the cavity. The barrel of the lens member defines a channel which extends inside a wall section of the barrel of the lens member in parallel with the longitudinal lens member axis and which has a first end opening facing a field of view of the lens arrangement. The lens arrangement comprises an emitter arranged to emit electromagnetic radiation to an area located in the field of view of the lens arrangement via the channel and the first end opening.

The channel extends inside the wall section of the barrel of the lens member. By this, a compact lens arrangement with improved functionality may be achieved. By the channel extending inside the wall of the barrel, the alignment of the channels and the emitter may be facilitated.

The channel may comprise a light guide. The light guide may be arranged in the channel.

The emitter may be arranged to emit or receive electromagnetic radiation in the form of at least one of: UV light, IR light, radar radio waves, visible light, or laser light. It is to be noted that the emitter may emit different electromagnetic radiation. By using for example IR light, a camera device comprising the lens arrangement may be suited for use in a darker environment. Radar or laser may enable the lens arrangement to determine distances of what is present in the field of view.

The lens arrangement may further comprise an image sensor arranged at a bottom of the cavity. The image sensor is faced towards the lens unit.

The channel may further comprise a second end opening. By the channel comprising the second opening, the emitter may be positioned outside the channel and be arranged to emit the electromagnetic radiation entering the channel via the second end opening.

The second end opening may be point-shaped. The first end opening may have a semi annular or annular shape. A semi annular or annular shape of the first end opening may improve the functionality and effectiveness of the emission of electromagnetic radiation of the lens arrangement. If the electromagnetic radiation is any sort of light, a more even distribution of said light may be achieved.

The lens arrangement may further comprise a connector providing a communication between the emitter and the second end opening of the channel. Thus, the emitter may be arranged on for example a part of the camera device and connected to the lens arrangement through the connector. This may provide flexibility of manufacturing processes when manufacturing the lens arrangement. This may provide a cost efficient and compact lens arrangement.

The second end opening may be faced towards the emitter. Hereby the emitter may communicate directly with the channel without the provision of a connector, which may facilitate assembly of lens arrangement.

The emitter may be arranged in the vicinity of an image sensor arranged at a bottom of the cavity. Hereby, the provision of improved functionality of the lens arrangement may be facilitated.

In a modular camera, the emitter may be connected to the image sensor, to the main unit or to a control unit associated with the image sensor or the main unit.

The lens member may be slidingly insertable into the lens holder. The lens member's configuration to be slidingly insertable into the lens holder may provide facilitated assembly of the lens arrangement. This may provide a cost efficient lens arrangement. By this configuration, the alignment of the channels may be facilitated.

The barrel may comprise a wall section in the form of a lens member protrusion extending radially outwardly. The channel may extend inside the lens member protrusion thus enabling maintaining the compactness of the lens member. Also, the provision of a lens member protrusion may enable mounting the lens member in the lens holder without any need of a thread joint. Thus, the risk of blemishing of images captured by the image sensor may be reduced.

The lens holder of the lens arrangement may comprise corresponding protrusions to the lens member protrusions, such that the lens member is slidingly insertable into the lens holder without the need for any threaded arrangement.

The lens holder may comprise grooves corresponding to the lens member protrusions to facilitate assembly of the lens arrangement.

The lens member protrusion may comprise threads corresponding to threads on the lens holder protrusions such that the lens member is insertable into the lens holder by a threaded fitting.

According to a second aspect, there is provided a camera device comprising a lens arrangement as described above. The camera device may be a modular camera.

Generally, the different features and advantages of the second aspect have been discussed in detail in relation to the first aspect. That discussion is equally valid in relation to the second aspect and reference is therefore made to the above discussion. It may be noted that the various embodiments or optional features are equally applicable to the second aspect.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein:

FIG. 4b is a perspective view of lens member of the lens arrangement shown in FIG. 4a.

DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

A lens arrangement of a camera device will in the following be described with reference to FIGS. 1-3.

Figure 1:
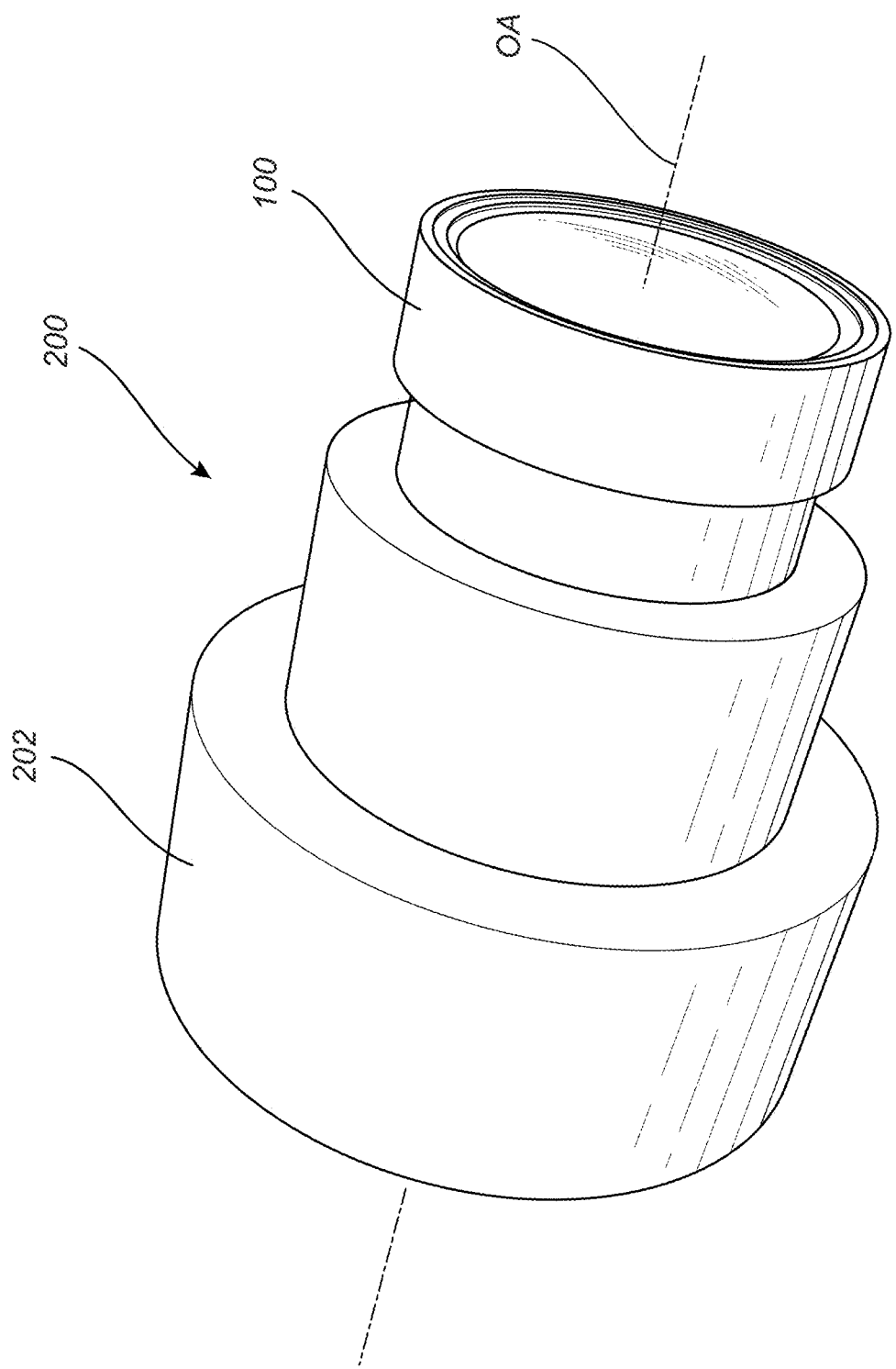
FIG. 1 is a perspective view of a lens arrangement.

FIG. 1 illustrates an embodiment of the lens arrangement 200. The lens arrangement comprises a lens holder 202 and a lens member 100 releasably attached to the lens holder 202. The lens holder 202 and the lens member 100 are aligned along an optical axis OA of the lens arrangement 200. In an assembled state, the optical axis OA coincides with a longitudinal lens member axis A.

The lens arrangement 200 may be comprised in a camera device. The camera device may be a modular camera, comprising a sensor unit and a main unit connected to the senor unit via cable. The lens arrangement 200 may be included in the sensor unit. The main unit may be arranged for image processing and network communication. The main unit may be placed separately from the sensor unit. The main unit may alternatively be placed together with the sensor unit.

It should be noted that the camera device need not be a modular camera and thus that the invention is applicable also to other types of camera devices.

The camera device comprising the lens arrangement 200 may be a monitoring camera providing video sequences.

Figure 2:
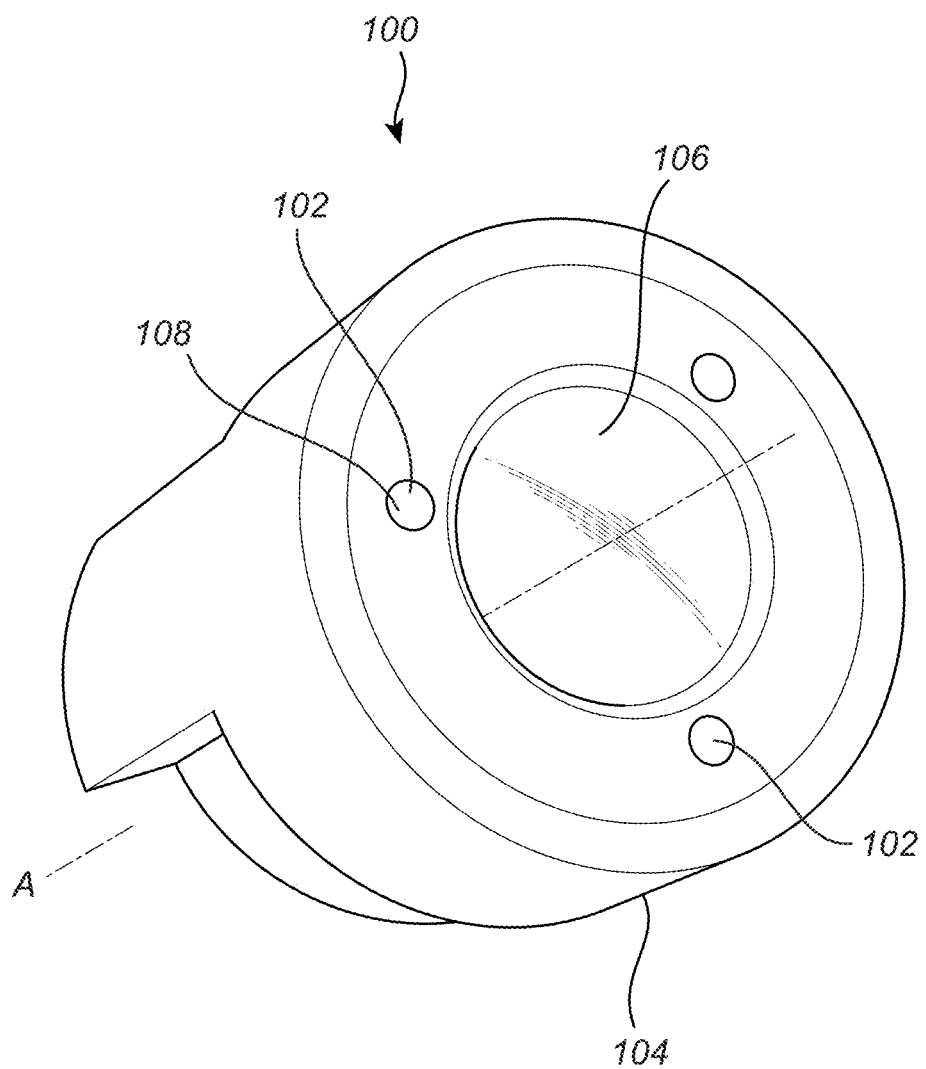
FIG. 2 is a perspective view of a lens member.

As is evident from FIG. 2, the lens member 100 comprises a barrel 104 enclosing a lens unit 106. The barrel comprises at least one channel 102 being defined by said barrel 104. The barrel has an extension along the longitudinal lens member axis A. Each channel 102 extends in parallel to the longitudinal lens member axis A. Each channel 102 comprises a first end opening provided at a front end of the lens member 100. In the assembled state, the front end of the lens member 100 is directed towards a field of view of the lens arrangement 200.

The shown embodiment comprises three channels 102 extending inside the wall of the barrel.

The lens member 100 is associated with an emitter and/or receiver 110. The lens member 100 may thus be arranged to emit or receive sound and/or electromagnetic radiation.

In some embodiments, the channel 102 may be configured to guide sound and/or electromagnetic radiation from an emitter associated with the lens member 100 to an area in front of the lens member 100 via the first end opening 108. Thus, in an assembled state, the lens arrangement 200 may emit sound and/or electromagnetic radiation to an area located in the field of view of the lens arrangement 200.

In some embodiments, the channel 102 may be configured to guide sound and/or electromagnetic radiation from an area in front of the lens member 100 to a receiver associated with the lens member 100 via the first end opening 108. Thus, in an assembled state, the lens arrangement 200 may receive sound and/or electromagnetic radiation from an area located in the field of view of the lens arrangement.

The lens unit 106 may function together with the emitter and/or receiver 110 to capture more than images of the field of view, for example movement or sound. Thus, a camera device with improved functionality may be provided.

In one example, the channel may comprise a light guide arranged in the channel. A light guide may allow for the channel 102 to be crooked or curved, guiding light through the channel 102. The light guide may improve the ability of the lens unit 106 to capture high quality images whereas the lens unit 106 on itself may not be able to capture a high quality image and an added light guided by a light guide to the front end of the lens member may improve the quality of captured images.

Figure 3:
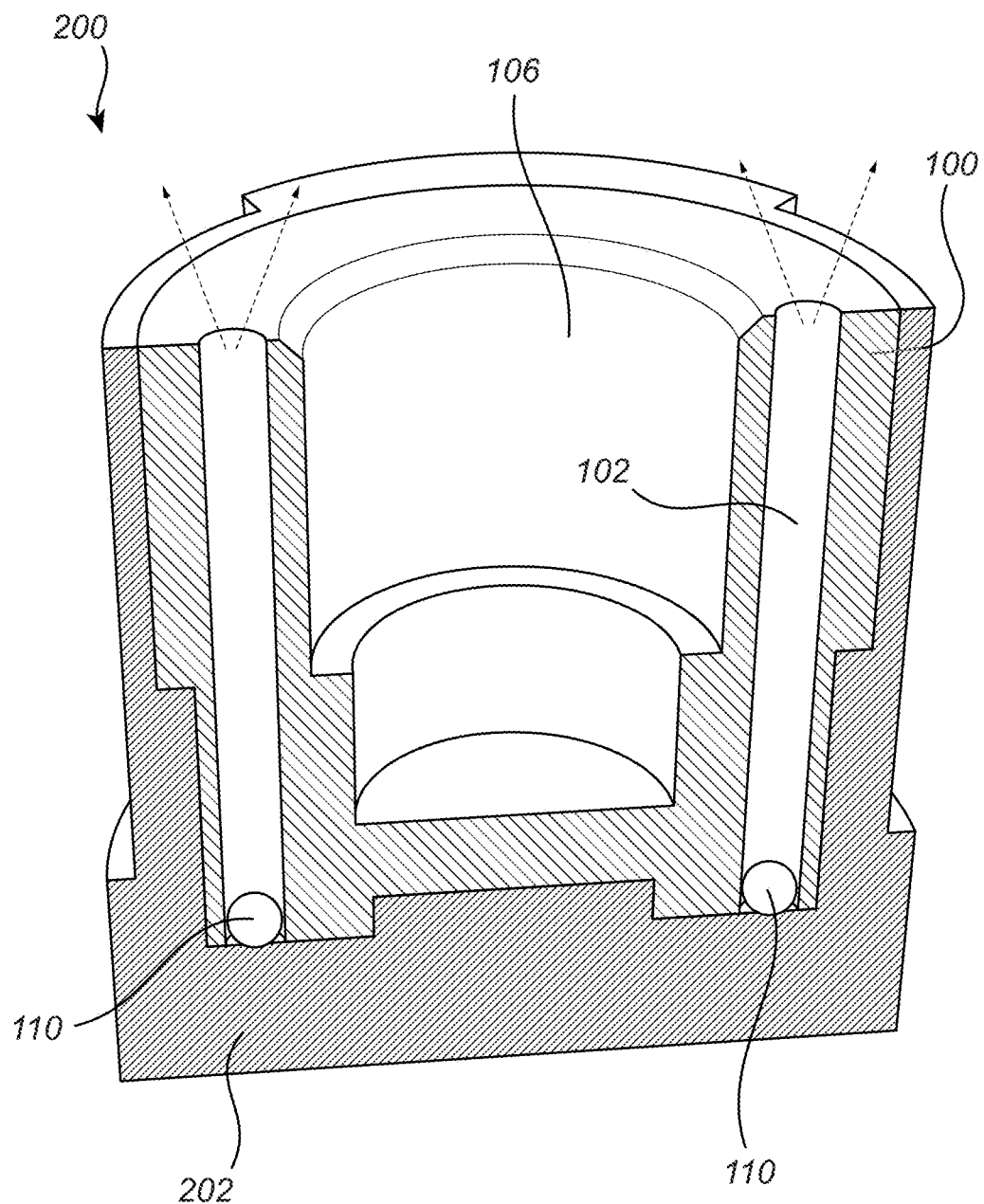
FIG. 3 is a cross sectional view illustrating a lens arrangement.

In FIG. 3, which is a cross sectional view of the lens arrangement 200, the lens arrangement 200 is illustrated in an assembled state, i.e. the lens member 100 being inserted into the lens holder 202. The lens holder 202 comprises a wall surrounding a cavity. In the assembled state, the lens member 100 or at least a part of the lens member 100 is inserted into the cavity of the lens holder 202.

The barrel 104 of the lens member 100 defines a channel extending in parallel to the longitudinal lens member axis A. The channel 102 of the lens member 100 has a first end opening facing a field of view of the lens arrangement 200. The field of view may be at a front end of the lens member 100. The cavity of the lens holder 202 is arranged to receive the lens member 100.

The lens member 100 may be arranged to be insertable into cavity of the lens holder 202 by threading. When the lens member 100 is inserted into the lens holder 202 by threading the lens arrangement may be configured such that there is an end position of the lens member 100. When the lens member 100 is at the end position, the channels 102 are aligned with the emitter and/or receiver 110.

The lens member 100 may be arranged to be slidingly insertable into cavity of the lens holder 202. By configuring the lens arrangement such that the lens member 100 is slidingly insertable into the lens holder 202, it may facilitate assembly of the lens arrangement with a reduced risk of misalignment of the channels and receiver and/or emitter 110.

The lens arrangement 200 may comprise an emitter 110 arranged to emit sound and/or electromagnetic radiation to an area located in the field of view of the lens arrangement 200 via the channel 102 and the first end opening. The lens arrangement 200 may comprise a receiver 110 arranged to receive sound and/or electromagnetic radiation from an area located in the field of view of the lens arrangement 200 via the first end opening and the channel 102. The channel 102 of the lens arrangement 200 may comprise a light guide arranged in the channel 102.

The emitter 110 may be arranged to emit electromagnetic radiation in the form of at least one of: UV light, IR light, radar radio waves, visible light, or laser light.

The receiver 110 may be arranged to receive electromagnetic radiation in the form of at least one of: UV light, IR light, radar radio waves, visible light, or laser light.

The channel 102 may define a straight line of sight between the emitter and/or receiver 110 and the area located in the field of view of the lens arrangement. This may be beneficial when the electromagnetic radiation is a laser light.

By way of example, the lens arrangement 200 of the camera device may comprise an emitter for emitting IR. The emitter 110 may emit IR light such that the camera device can capture high quality images during poor visibility conditions, such as during night time. The configuration of the channel 102 of the lens arrangement may ensure that a compact camera device can be manufactured and used since there is no need for IR lights to be placed on the outside of the lens arrangement 200.

The first end opening may be semi annular or annular. In an example where the first end opening has an annular shape, the emitter 110 may be configured to emit light. In the example, the annular first end opening may be arranged such that the emitted light is spread outwards to the field of view of the lens arrangement 200. An evenly distributed emission of light may be achieved. This may improve the functionality of the lens arrangement 200 and the ability to capture high quality images or video sequences. The annular first end opening may comprise a light guide to more evenly spread light to the field of view of the lens arrangement 200.

The light distribution of the light exiting from the channel may be controlled by a lens arranged in the end of the channel which as described above may comprise a light guide.

Alternatively, the first end opening may be arranged to direct light in a specific direction or composition. The light may be emitted into a specific zoom position of the lens arrangement. By way of example, the emitter may be arranged to emit a zoomed light at a certain distance and direction and aimed at a certain object. Zooming light towards a specific object may be performed in connection to choosing a lens in order to obtain desired quality of captured images.

The channel 102 may have a closed end opposite to the first end opening. In such a case, the emitter and/or the receiver 110 may be arranged inside the channel 102.

The channel 102 may alternatively comprise a second end opening in the end opposite to the first end opening, as shown in the figures. The second end opening may be faced towards the emitter and/or receiver 110. The second end opening may be point-shaped. Alternatively, the second end opening may have a circumferential extension.

The channel 102 extending between the first end opening and the second end opening may have constant or a varying cross section.

The channel 102 may have an extension in the circumferential direction and at least partly enclose the lens unit 104, i.e. the channel 102 may have an annular or a semi annular cross section.

Thus, the channel 102 may extend with a constant cross section between the first end opening to the second end opening, wherein the constant cross section for example may be circular as shown in FIG. 3. However, other constant cross sections are feasible.

In another example, the channel may extend with a varying cross section between a semi annular first end opening partly enclosing the lens unit 104 and a circular first end opening.

In yet another example, the channel 102 may have a constant cross section and extend between a semi annular first end opening partly enclosing the lens unit 104 and a correspondingly semi annular second end opening.

The emitter and/or receiver 110 may be arranged at the second end opening.

The emitter and/or receiver 110 may be arranged inside the lens arrangement 200 or may be arranged separate from the lens arrangement 200.

The lens arrangement 200 may comprise a connector providing a communication between the emitter and/or receiver 110 and the second end opening of the channel 102. The connection may allow for flexibility as to where the emitter and/or receiver 110 is arranged. By arranging the emitter and/or receiver 110 on an outside of the channel 102, a simple to manufacture lens member 100 and lens arrangement 200 may be provided.

The lens arrangement 200 may comprise an image sensor. The image sensor may be arranged at a bottom of the cavity. The image sensor may be included in a printed circuit board. The image sensor may be connected to the main unit. The image sensor may be faced towards the lens unit 106. The emitter and/or receiver 110 may be arranged on or adjacent to the image sensor printed circuit board. By this, the emitter and/or receiver 110 may be easily connected to the image sensor. The lens arrangement 200 may comprise a heat sink. The heat sink may increase the lifespan of the lens arrangement 200, since the image sensor may be sensitive to heat generated by the emitter and/or the sensor.

Figure 4A:
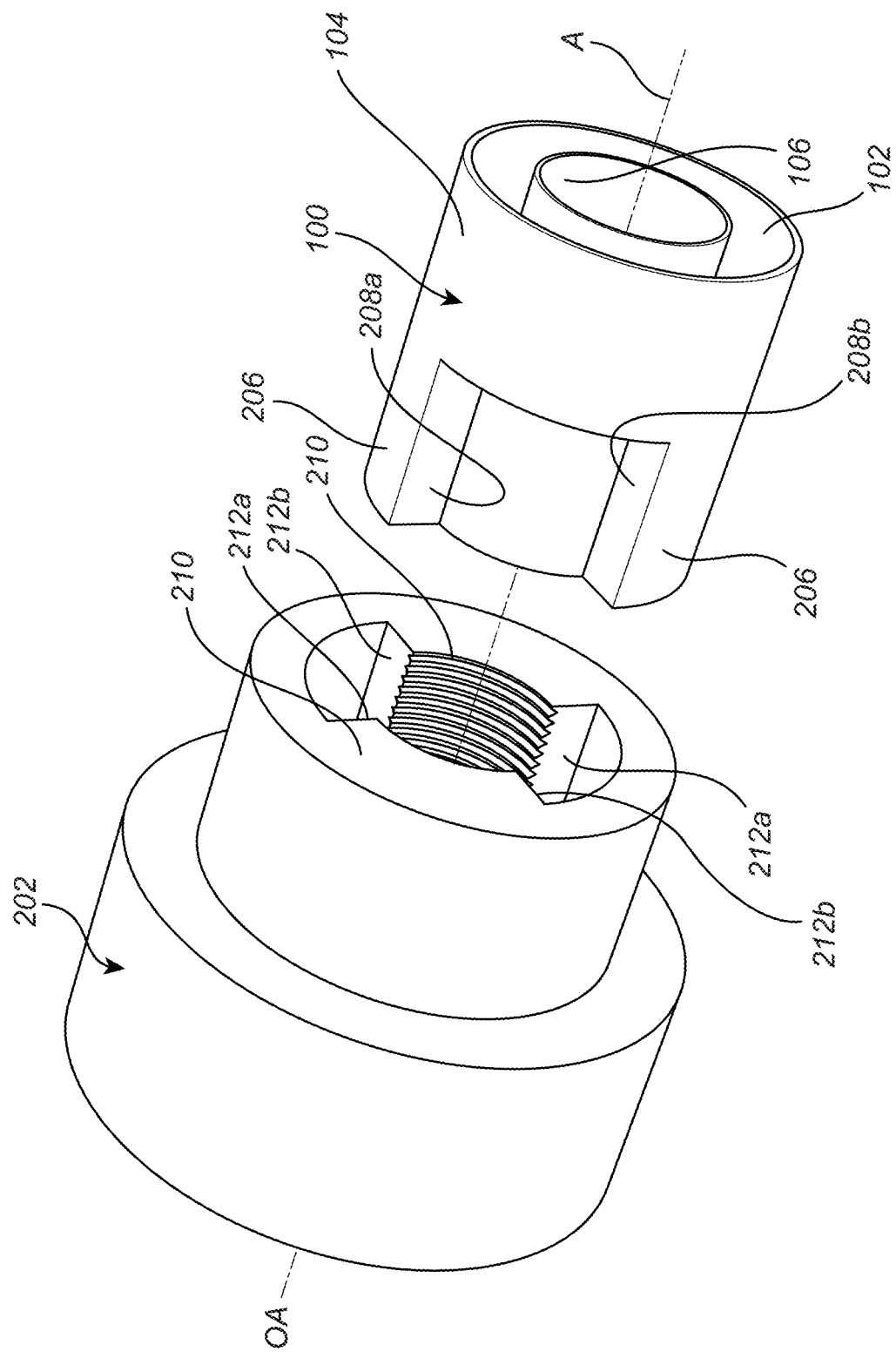
FIG. 4a is a perspective view in exploded form of an embodiment of a lens arrangement.

A second embodiment of the lens arrangement 200 will now be described with reference to FIGS. 4a, b. The shown embodiment of the lens arrangement 200 comprises a lens holder 202 and a lens member 100 which is slidingly insertable into a cavity of the lens holder 202.

The lens member 100 comprises a barrel 104 enclosing a lens unit 106 and extends along a lens member axis A.

The barrel 104 comprises two wall sections, each in the form of a lens member protrusion 206 extending radially outwardly. Each lens member protrusion comprises a first and a second lens member surface section 208a, 208b. Each one of the first and second lens member surface sections 208a, 208b extends in a plane, which is defined by the longitudinal lens member axis A and a normal to the longitudinal lens member axis A.

A channel 102 is provided in the wall of the barrel and has an extension inside both lens member protrusions. The lens member may comprise two separate channels 102, one extending inside each one of the lens member protrusions 206.

Figure 4B:
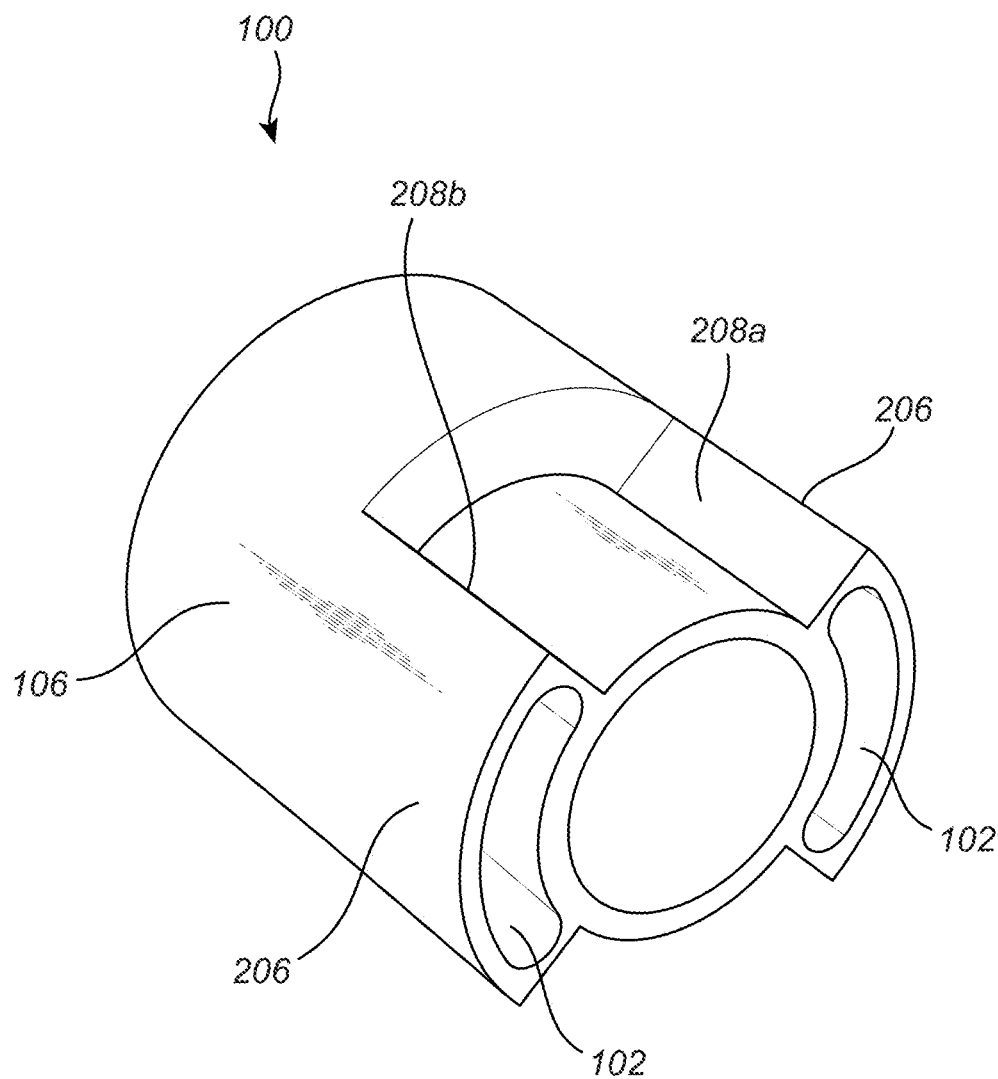

The channel 102 comprises a first annular section terminating in an annular first end opening at the front end of the lens member 100. The first annular section of the channel 102 adjoins a second section in which the channel bifurcates into two channel segments, each extending inside a respective one of the two lens members protrusion 206 and terminating in a first end opening having a circumferential extension, as evident from FIG. 4b illustrating the lens member 100 from the rear side.

The cavity of the lens holder 202 is complementary formed to the lens member 100 such that the lens member 100 is slidingly insertable into the cavity. More specifically, the lens holder comprises lens holder protrusions 210 each having a first and a second lens holder surface section 212a, 212b. Each one of the first and second lens holder surface sections 212a, 212b extends in a plane being defined by the optical axis A and a normal to the optical axis A.

By aligning the lens member protrusions 206 with the grooves formed between the lens holder protrusions 210, the lens member is slidingly insertable into the cavity of the lens holder.

The lens member 100 may be locked in the cavity by a locking member exerting a locking force.

It will be appreciated that the present invention is not limited to the embodiments shown. Several modifications and variations are thus conceivable within the scope of the invention which thus is exclusively defined by the appended claims.

The invention claimed is:

1. A lens arrangement for a camera device, the lens arrangement comprising:
    a lens member comprising a barrel enclosing a lens unit and extending along a longitudinal lens member axis;
    a lens holder comprising a wall surrounding a cavity; and
    an image sensor arranged at a bottom of the cavity,
    wherein the image sensor is faced towards the lens unit,
    wherein the lens member is at least partly inserted into the cavity,
    wherein the barrel of the lens member defines a channel which extends inside a wall section of the barrel of the lens member in parallel with the longitudinal lens member axis and which has a first end opening facing a field of view of the lens arrangement, and
    wherein the lens arrangement comprises an emitter arranged to emit electromagnetic radiation to an area located in the field of view of the lens arrangement via the channel and the first end opening.

2. The lens arrangement according to claim 1, wherein the channel comprises a light guide arranged in the channel.

3. The lens arrangement according to claim 1, wherein the emitter is arranged to emit electromagnetic radiation in the form of at least one of: UV light, IR light, radar radio waves, visible light, or laser light.

4. The lens arrangement according to claim 1, wherein the channel further comprises a second end opening.

5. The lens arrangement according to claim 4, wherein the second end opening is point-shaped; and wherein the first end opening has a semi annular or annular shape.

6. The lens arrangement according to claim 4, further comprising a connector providing a communication between the emitter and the second end opening of the channel.

7. The lens arrangement according to claim 4, wherein the second end opening is faced towards the emitter.

8. The lens arrangement according to claim 7, wherein the emitter is arranged on or adjacent to an image sensor arranged at a bottom of the cavity.

9. The lens arrangement according to claim 1, wherein the lens member is slidingly insertable into the lens holder.

10. The lens arrangement according to claim 9, wherein the barrel comprises a wall section in the form of a lens member protrusion extending radially outwardly; and wherein the channel extends inside the lens member protrusion.

11. The lens arrangement according to claim 1, wherein the lens member is releasably attached to the lens holder.

12. A camera device comprising a lens arrangement, the lens arrangement comprising:
   a lens member comprising a barrel enclosing a lens unit and extending along a longitudinal lens member axis;
   a lens holder comprising a wall surrounding a cavity; and
   an image sensor arranged at a bottom of the cavity,
   wherein the image sensor is faced towards the lens unit,
   wherein the lens member is at least partly inserted into the cavity,
   wherein the barrel of the lens member defines a channel which extends inside a wall section of the barrel of the lens member in parallel with the longitudinal lens member axis and which has a first end opening facing a field of view of the lens arrangement, and
   wherein the lens arrangement comprises an emitter arranged to emit electromagnetic radiation to an area located in the field of view of the lens arrangement via the channel and the first end opening.

13. A lens arrangement for a camera device, the lens arrangement comprising:
   a lens member comprising a barrel enclosing a lens unit and extending along a longitudinal lens member axis; and
   a lens holder comprising a wall surrounding a cavity,
   wherein the lens member is at least partly inserted into the cavity,
   wherein the barrel of the lens member defines a channel which extends inside a wall section of the barrel of the lens member in parallel with the longitudinal lens member axis and which has a first end opening facing a field of view of the lens arrangement,
   wherein the lens arrangement comprises an emitter arranged to emit electromagnetic radiation to an area located in the field of view of the lens arrangement via the channel and the first end opening,
   wherein the channel further comprises a second end opening, and
   wherein the lens arrangement further comprises a connector providing a communication between the emitter and the second end opening of the channel.

* * * * *